United States Patent [19]

Chen et al.

[11] Patent Number: 5,245,336

[45] Date of Patent: Sep. 14, 1993

[54] DIGITIZER WITH OVERLAPPED LOOP PATTERN AND PEAK PHASE RECOGNIZER

[75] Inventors: Jung-Yu Chen; Michael Su, both of Taipei, Taiwan

[73] Assignee: Wintime Technology Inc., Taipei Hsien, Taiwan

[21] Appl. No.: 726,209

[22] Filed: Jul. 5, 1991

[51] Int. Cl.$^5$ ............................................. H03M 1/22
[52] U.S. Cl. ........................................ 341/5; 341/15; 178/18
[58] Field of Search ..................... 341/4, 5, 8, 15, 111; 178/18

[56] References Cited

U.S. PATENT DOCUMENTS

| | | | |
|---|---|---|---|
| 3,819,857 | 6/1974 | Inokuchi | 341/15 |
| 4,029,899 | 6/1977 | Gordon | 341/5 |
| 4,080,515 | 3/1978 | Anderson | 341/5 |
| 4,255,617 | 3/1981 | Carau, Sr. et al. | 341/5 |
| 4,878,553 | 11/1989 | Yamanami et al. | 341/15 |

*Primary Examiner*—Marc Hoff
*Attorney, Agent, or Firm*—Jacobson, Price, Holman & Stern

[57] ABSTRACT

A digitizer comprising a microprocessor, a quartz oscillator, a cursor or stylus, an overlapped loop assembly, a peak phase recognizer, an analog/digit converter and other matching devices including multiplexers, amplifiers, filters and etc., wherein the overlapped loop assembly includes a plurality of loops for horizontal axis respectively starting from the left and the middle and a plurality of loops for vertical axis respectively starting from the bottom and the middle to overlap on the loops for horizontal axis forming into an induction area, the first loop for the horizontal axis at the left being connected to the first loop for the horizontal axis at the middle and the posterior loops for the horizontal axis at the left as well as the loops for the vertical axis at the bottom being respectively connected to the posterior loops for the horizontal axis at the middle and the loops for the vertical axis at the middle. The peak phase recognizer is an electric wave phase comparator to compare the output signal from the induction are induced by the oscillating source (cursor or stylus) with the reference frequency from the oscillating source and then send the comparison result thus obtained to the microprocessor for identifying which section on the overlapped loop assembly the oscillating source is allocated.

2 Claims, 4 Drawing Sheets

DIGITIZER WITH OVERLAPPED LOOP PATTERN AND PEAK PHASE RECOGNIZER

BACKGROUND OF THE INVENTION

The present invention relates to a digitizer and relates more particularly to a digitizer with overlapped loop assembly and peak phase recognizer in which two sets of loops are respectively overlapped and connected together forming into an induction area and, a peak phase recognizer is provided to compare the peak phase of the induced signal with reference signal so as to identify which section the cursor or stylus is allocated on the overlapped loop assembly. Therefore, scanning half of the overlapped loop assembly is sufficient for recognizing the location of the cursor or stylus. Flexible printed circuit board (FPCB) may be used to minimize the size of the digitizer.

A digitizer is an electronic device for translating analog data into digital data. In the conventional structure of digitizer, a cursor or stylus is used as an oscillating source to induce a signal on an induction area which is formed of a loop assembly, according to right-hand rule, which signal is detected by decoders and X and Y multiplexers and then processed through an amplifier circuit and a filter circuit into a low frequency analog signal which is further processed through a microprocessor so as to determine the absolute position of the cursor or stylus on X-axis and Y-axis. Moving the cursor or stylus produces another X, Y value.

SUMMARY OF THE INVENTION

The present invention is to design an overlapped loop pattern to match with a peak phase recognizer to detect the moving of a cursor or stylus. Scanning half of the induction area is sufficient to detect the location of a cursor or stylus. Signal induced by a cursor or stylus is compared at the peak phase recognizer with the reference frequency to obtain a phase difference so as to determine the position of the cursor or stylus at either of the two blocks on the overlapped loop assembly and, at the same time, analog signal is converted into digital signal for processing through a microprocessor so as to obtain X, Y value.

DETAILED DESCRIPTION OF THE PREFERRED EMBODIMENT

Figure 1:
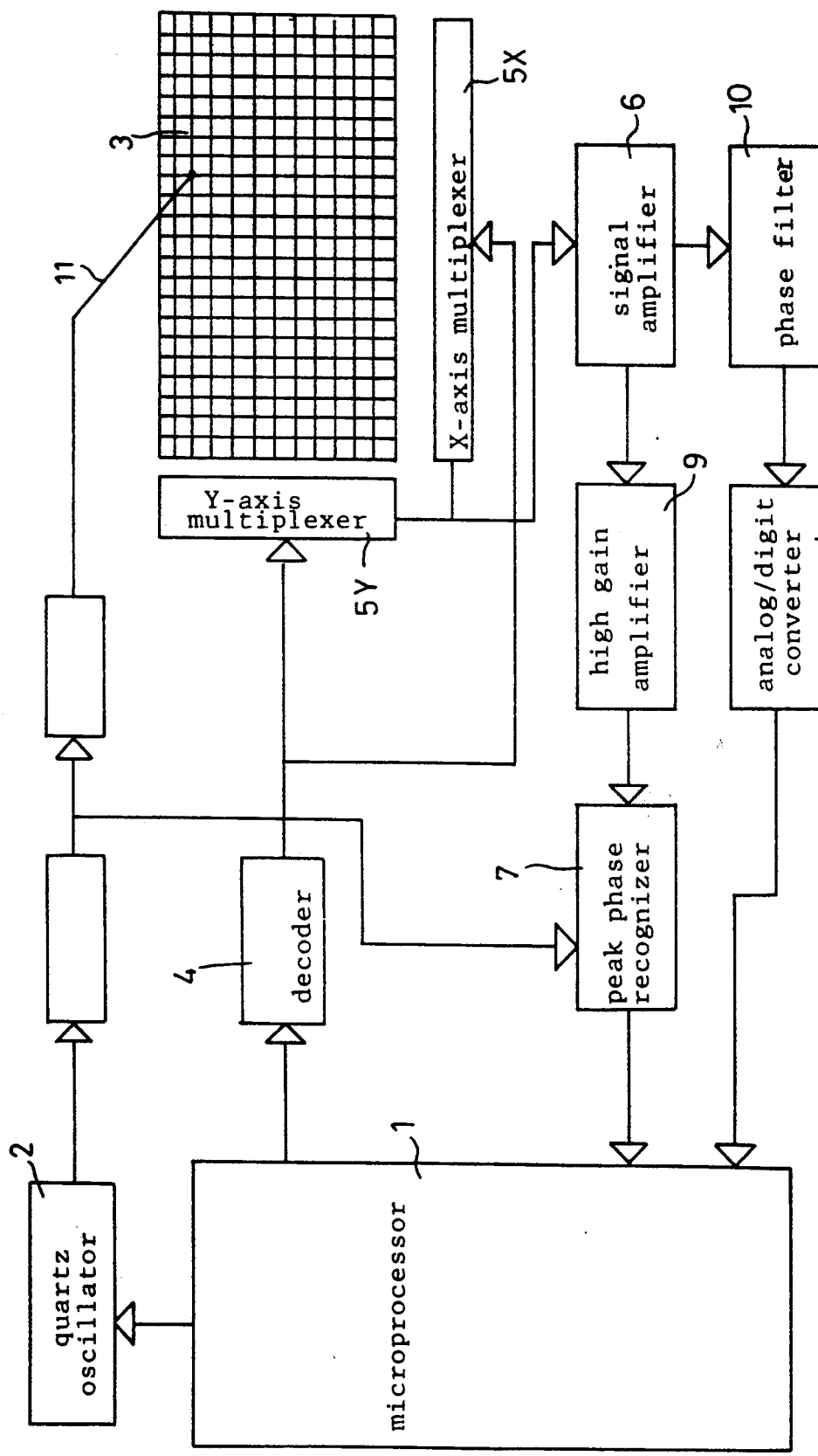
FIG. 1 is a circuit block diagram of the present invention.

Referring to FIG. 1, therein illustrated is a digitizer with overlapped loop assembly and peak phase recognizer constructed in accordance with the present invention, which is generally comprised of a microprocessor 1, a quartz oscillator 2, an overlapped loop assembly 3, a decoder 4, a X-axis multiplexer 5X, a Y-axis multiplexer 5Y, a signal amplifier 6, a peak phase recognizer 7 and an analog/digit converter 8.

Figure 2:
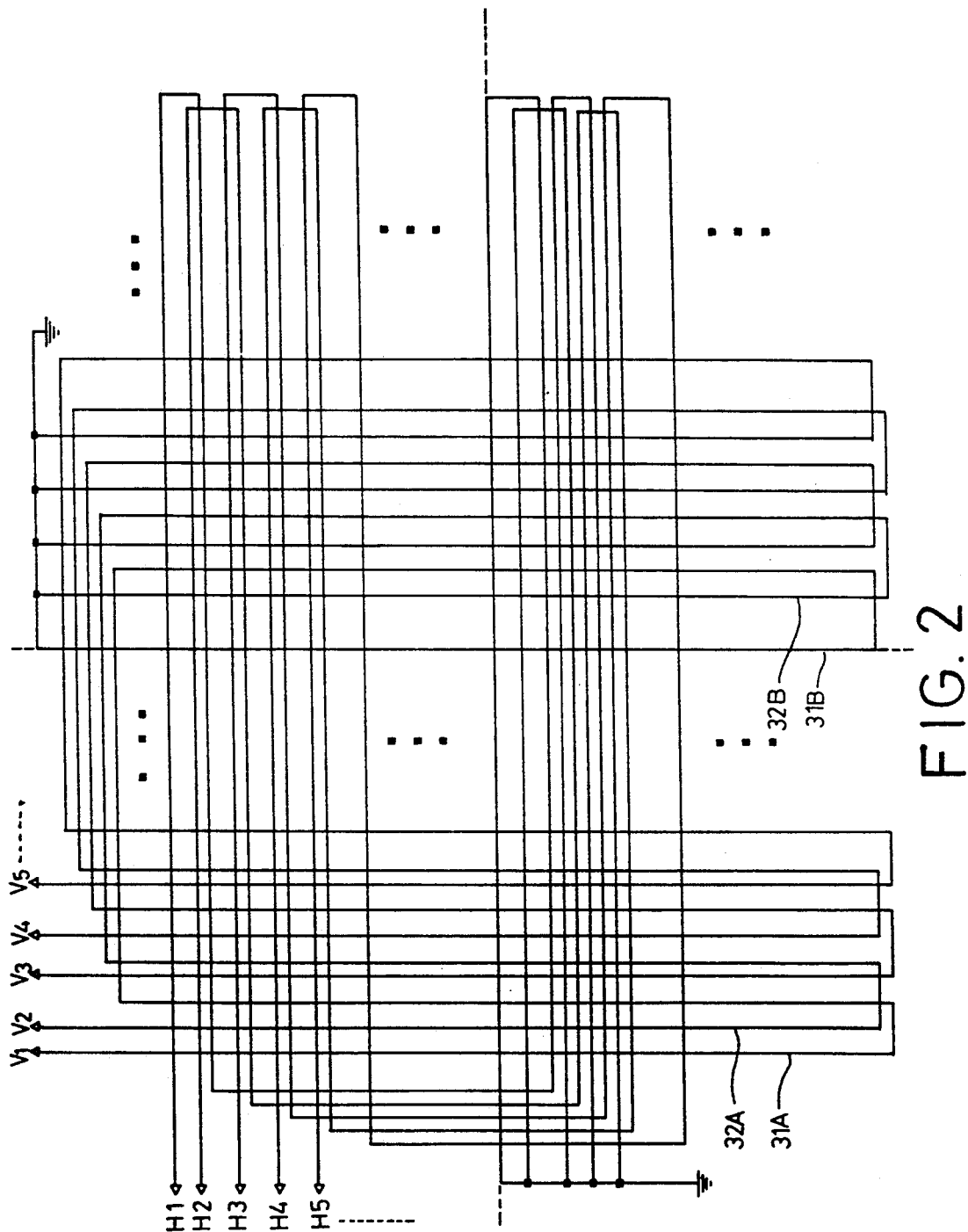
FIG. 2 is a schematic circuit diagram of the overlapped loop assembly according to the present invention.

Referring to FIG. 2, the overlapped loop assembly 3 is characterized in that the loops for horizontal axis start from the left and the middle and the loops for vertical axis start from the bottom and the middle to form into an induction area, wherein the first loop 31A for the horizontal axis at the left is connected to the first loop 31B for the horizontal axis at the middle, the second loop 32A for the horizontal axis at the left is connected to the second loop 32B for the horizontal axis at the middle, . . . and the last loop for the horizontal axis at the left is connected to the last loop for the horizontal axis at the middle. In the same manner, the loops for the vertical axis at the bottom are respectively connected to the loops for the vertical axis at the middle.

Figure 3:
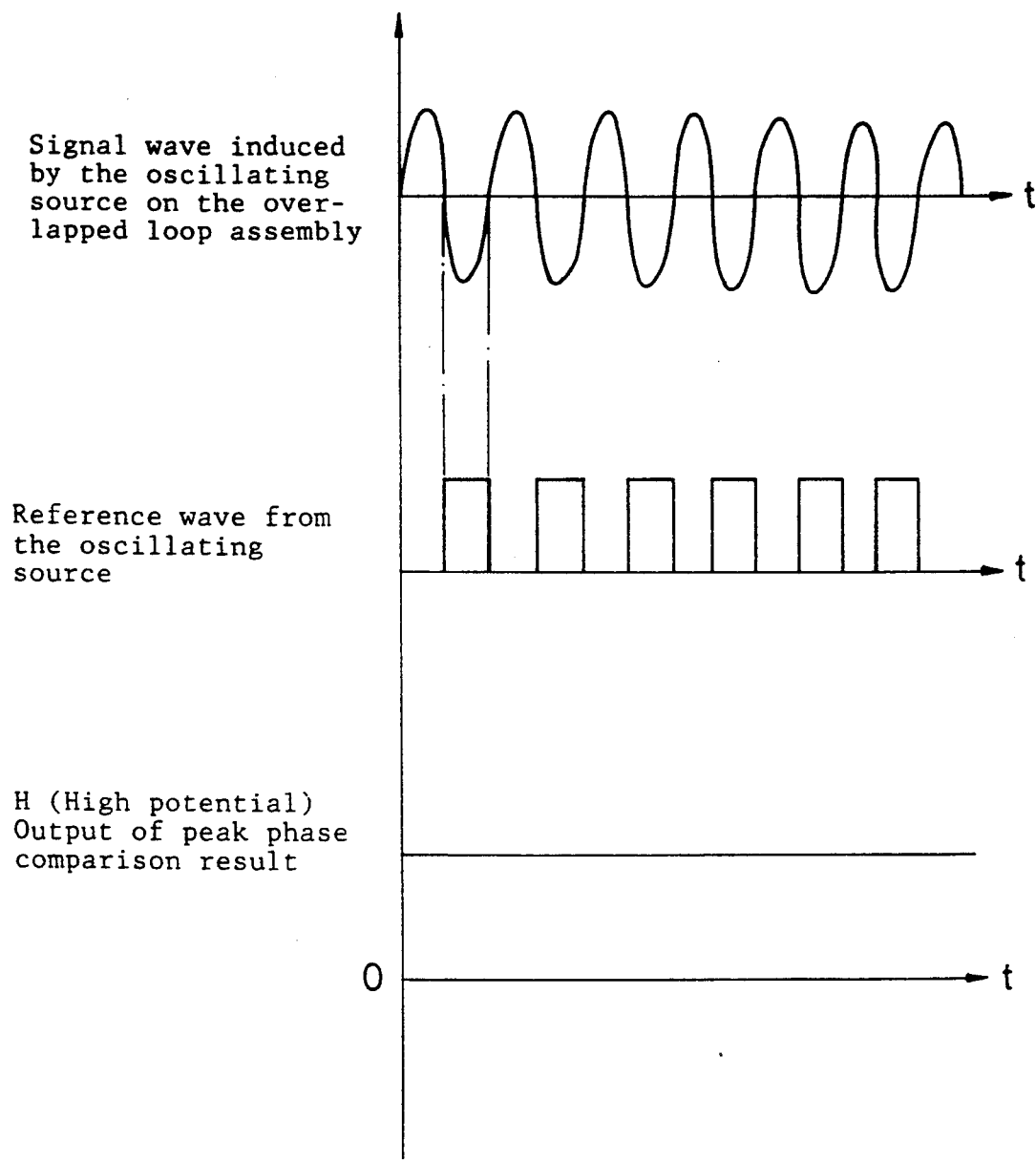
FIGS. 3 and 4 are peak phase waveform comparison charts obtained at different blocks.
Figure 4:
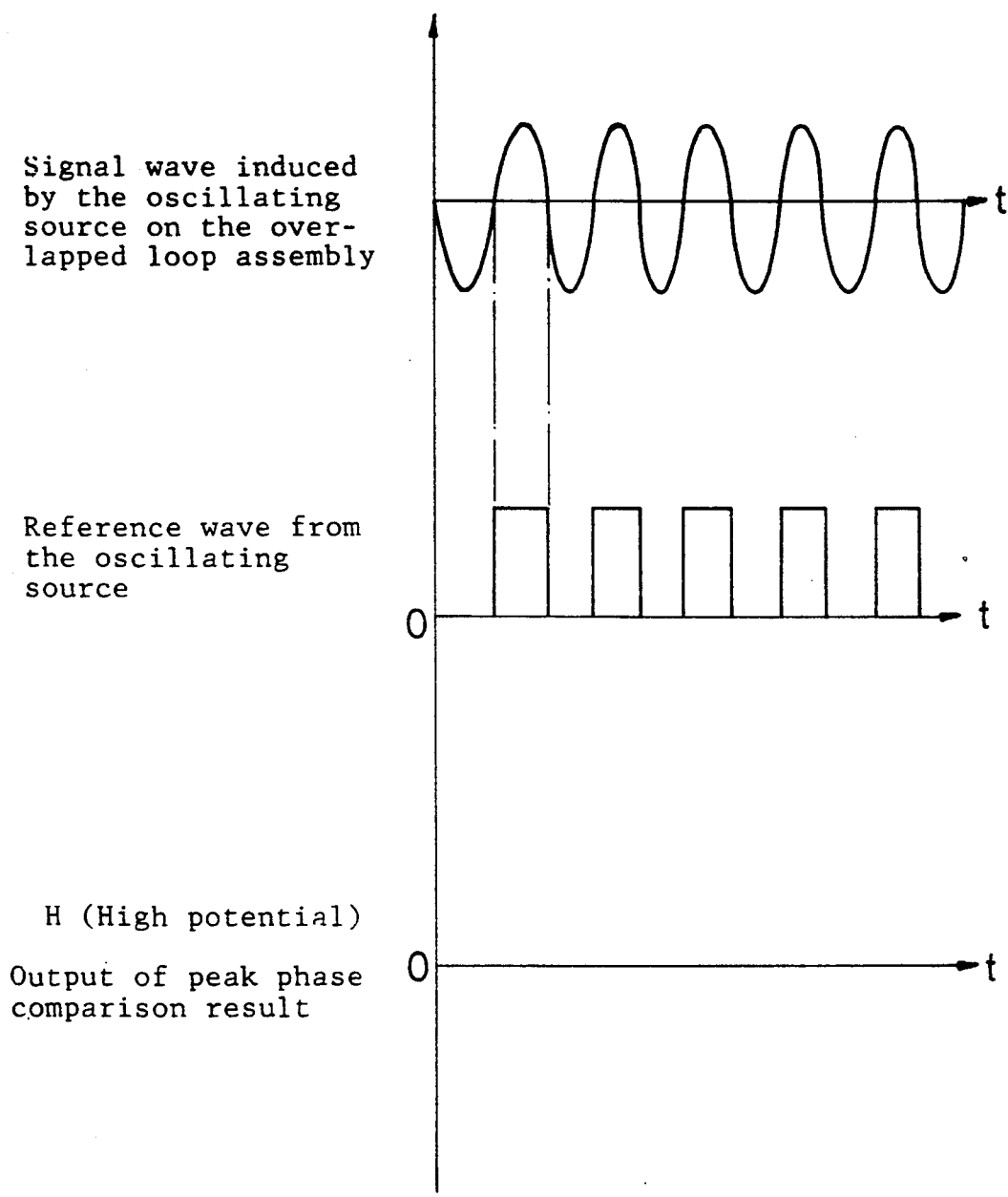

The peak phase recognizer 7 is to compare the fundamental frequency from a cursor or stylus (on the basis of the frequency from the quartz oscillator) with the peak phase of the induced signal frequency (see FIGS. 3 and 4). The comparison result will be "0" (low potential) when at synchronous phase and, the comparison result will be "1" (high potential) when phase difference reaches 180°. The comparison result thus obtained is then sent to the microprocessor 1 for processing, so as to indicate which section on the overlapped loop assembly 3 the cursor or stylus (i.e. the oscillating source 11) is allocated.

Referring to FIG. 1 again, oscillating source 11 is generated through the quartz oscillator 2 (i.e. produced by the cursor or stylus) onto the overlapped loop assembly 3 and then scanned by the decoder 4 and the X-axis and Y-axis multiplexers 5X and 5Y horizontally and vertically. Because the loops on the overlapped loop assembly are arranged at two blocks and respectively connected together (as illustrated in FIG. 2), scanning half ($\frac{1}{2}$) of the overlapped loop assembly is sufficient to detect the induction of the digitizer while using the decoder 4 and the X-axis and Y-axis multiplexers 5X and 5Y to scan the address of the lines. If the oscillating source 11 (cursor or stylus) is allocated at the first loop 31A at the left, the first loop 31B at the middle is simultaneously induced by a signal of same voltage but in reverse phase. Induced signal is then amplified by the signal amplifier 6 to provide an output to a high gain amplifier 9 which further gives a signal to the peak phase recognizer 7 for further peak phase comparison with the reference frequency from the oscillating source 11 produced by the quartz oscillator 2. The comparison result "0" or "1" thus obtained is then sent to the microprocessor 1 for processing, so as to recognize which section on the overlapped loop assembly 3 the oscillating source 11 is allocated. During peak phase comparison process, the signals induced by the X-axis and Y-axis multiplexers 5X and 5Y are sent through a phase filter 10 to the analog/digital converter 8 for converting into digital signals which are further sent to the microprocessor 1 for processing so as to obtain the absolute position of the X, Y value of the oscillating source 11 on the overlapped loop assembly 3. Therefore, the present invention reduces the use of peripheral parts, i.e., reduces the quantity of decoders 4 and X-axis and Y-axis multiplexers 5X and 5Y and, simultaneously reduces one half of the scanning time.

What is claimed is:

1. A digitizer for determining the position of a stylus or cursor, said digitizer comprising:
    a microprocessor for controlling the digitizer;
    a quartz oscillator responsive to said microprocessor;
    an overlapped loop assembly defining an induction area, said overlapped loop assembly comprising a plurality of overlapping loops for a horizontal axis and a plurality of overlapping loops for a vertical axis, each of said plurality of overlapping loops comprising a first turn in one direction and a second turn in an opposite direction, said first and second turns being distanced from one another by a distance equal to half the horizontal distance across the induction area in the case of said overlapping loops for the horizontal axis, and by a distance equal to half the vertical distance across the induction area in the case of said overlapping loops for the vertical axis;

a decoder responsive to said microprocessor, for selectively scanning said induction area;

an X-axis multiplexer responsive to said decoder, for selecting signals from said overlapped loop assembly;

a Y-axis multiplexer also responsive to said decoder, for selecting signals from said overlapped loop assembly;

signal amplification means for amplifying signals selected by said X-axis multiplexer and said Y-axis multiplexer;

a peak phase recognizer responsive, through said signal amplification means, to said signals selected by said X-axis multiplexer and said Y-axis multiplexer;

an analog-to-digital converter responsive, through said signal amplification means, to said signals selected by said X-axis multiplexer and said Y-axis multiplexer; said microprocessor being responsive to outputs from said analog-to-digital converter and from said peak phase recognizer.

2. The digitizer of claim 1, wherein said peak phase recognizer is responsive to a reference frequency from said quartz oscillator and is also responsive to said signals selected by said X-axis multiplexer and said Y-axis multiplexer, for comparing said reference frequency to said signals selected by said multiplexers, the result of said comparing being provided to the microprocessor in order to determine the location of said cursor or stylus with respect to said overlapped loop assembly.

* * * * *